United States Patent [19]

Leistner

[11] Patent Number: 4,711,980
[45] Date of Patent: Dec. 8, 1987

[54] NAIL COLLATOR AND WELDER

[75] Inventor: Walter H. Leistner, Willowdale, Canada

[73] Assignee: Sigma Tool & Machine Limited, Scarborough, Canada

[21] Appl. No.: 829,989

[22] Filed: Feb. 18, 1986

[51] Int. Cl.[4] ............... B23K 11/00; B65B 19/34; B65B 35/58; B65G 47/24
[52] U.S. Cl. ..................... 219/56; 198/389; 198/394; 221/173; 53/399; 53/444
[58] Field of Search ............... 219/56; 198/389, 394; 221/171, 173; 206/344, 345; 53/399, 389, 444, 591

[56] References Cited

U.S. PATENT DOCUMENTS

| | | | |
|---|---|---|---|
| 3,084,782 | 4/1963 | Bower | 221/173 |
| 3,152,334 | 10/1964 | Lingle | 206/334 |
| 3,736,198 | 5/1973 | Leistner | 156/498 X |
| 3,861,526 | 1/1975 | Leistner | 411/442 X |
| 3,997,065 | 12/1976 | Jaksch | 198/394 X |
| 4,409,461 | 10/1983 | Mizutani | 219/56 X |
| 4,442,965 | 4/1984 | Leistner | 227/136 |
| 4,529,858 | 7/1985 | Scaerr et al. | 219/56 |
| 4,549,419 | 10/1985 | Trost et al. | 198/394 X |

Primary Examiner—Howard N. Goldberg
Assistant Examiner—Taylor J. Ross
Attorney, Agent, or Firm—George A. Rolston

[57] ABSTRACT

Apparatus for forming nails into a nailing strip, in which nails are welded to wire strips, and having a nail feed, a nail indexing wheel indexing nails into predetermined nail spacings, a nail rotator to bring their heads in a predetermined orientation, a nail handling slide for receiving nails, a wire feed for feeding wire to one side of the nails, electrical welding contacts for pressing the wire against nail and passing a welding current to weld the wire to the nail, a moving device for moving the welding contacts towards and away from the nails, and a movement device for moving the nails along the nail slide.

5 Claims, 7 Drawing Figures

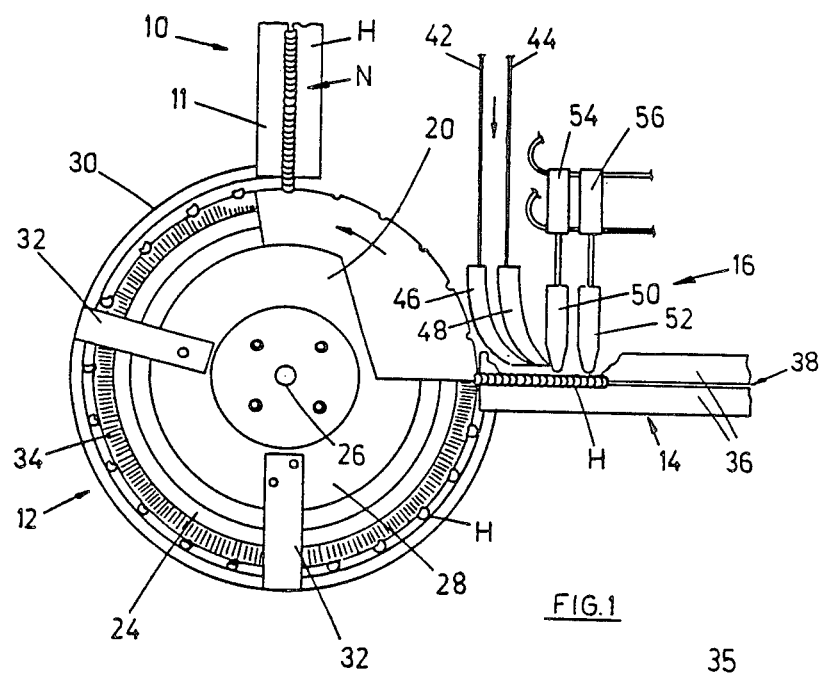
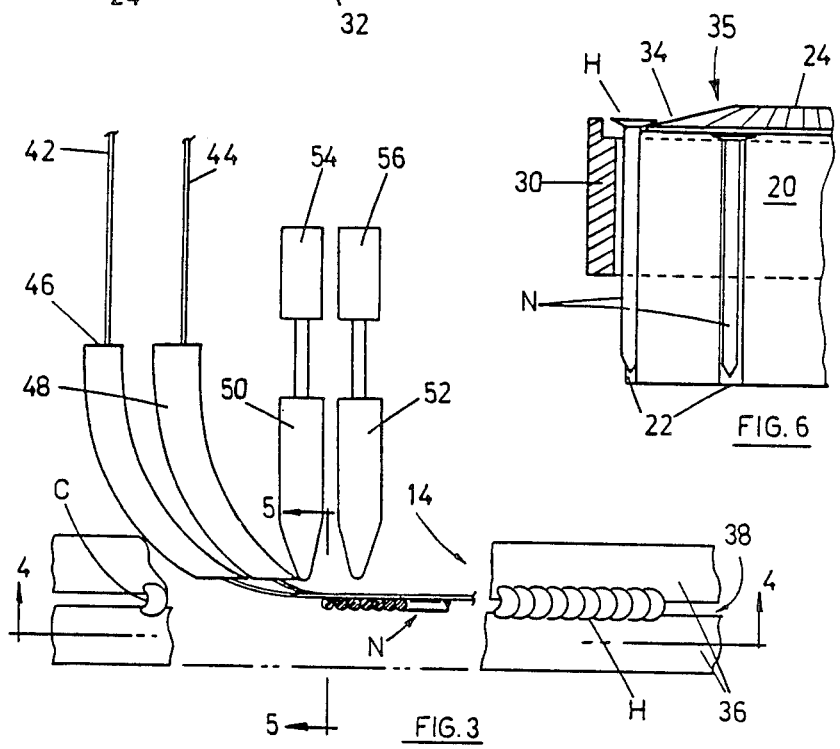

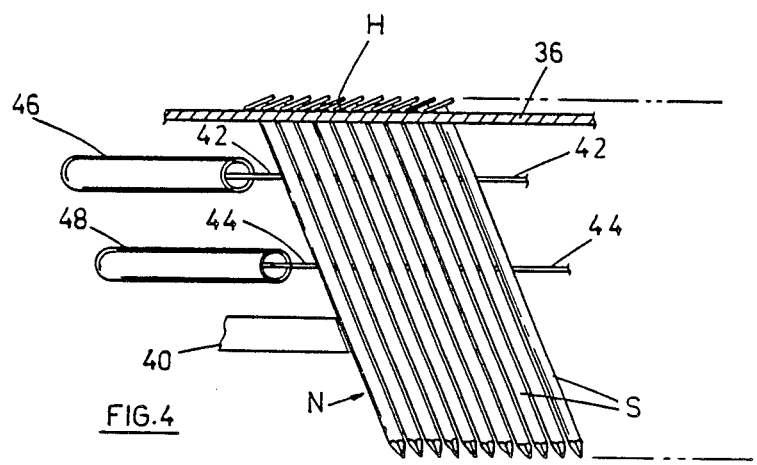
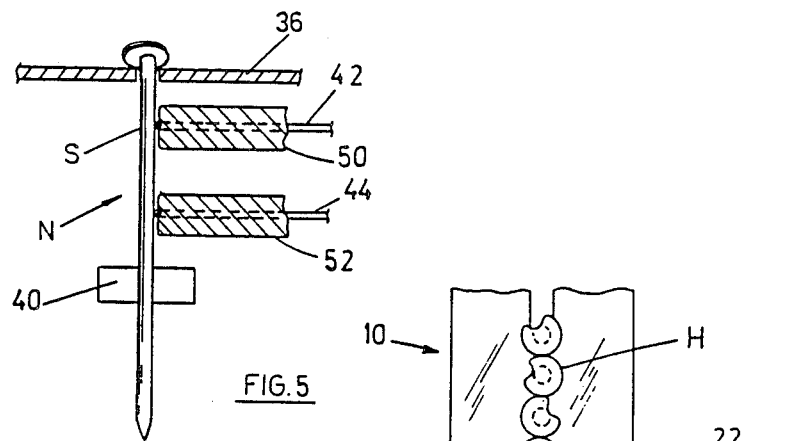
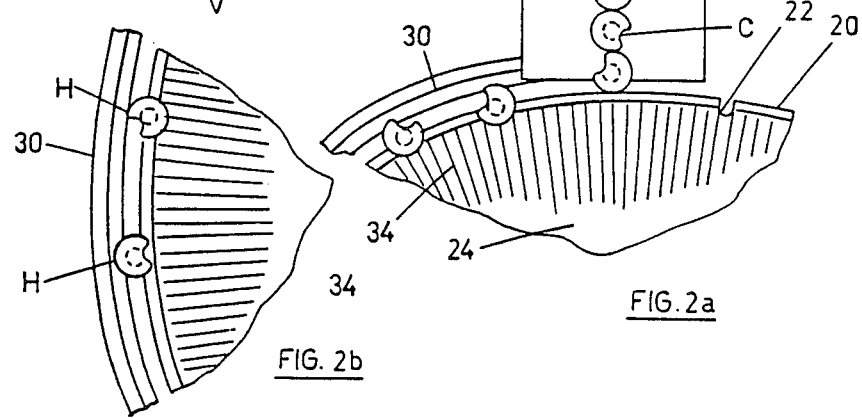

NAIL COLLATOR AND WELDER

The invention relates to apparatus for forming a nailing strip, and in particular to apparatus for forming a strip of nails, welded to links of wire, for use in nailing machines.

BACKGROUND OF THE INVENTION

Power operated nailing machines are in wide use in many industrial nailing applications Such nailing machines usually incorporate a pneumatic power cylinder, and a strip of nails, the nails being fed one by one under a power operated driver operated by the cylinder.

Nails can be inserted by driver strokes at great speed. This greatly reduces the time which would otherwise be required if such nails were hammered in manually The design of a suitable nailing strip for use in such machines presents a number of different problems. Generally speaking, the strip should be of a certain desired length, and in some cases should be adapted to coil, for insertion into a larger magazine. The strip should be sufficiently strong to withstand a certain amount of abuse on the worksite and also in shipping and packaging.

The junction between the nails should preferably be such that it can easily be broken by the operation of the plunger, without interfering with the operation of the nailing machine.

In addition to all these requirements, however, the fastening system should be such that it is adaptable to nails of different types having different nail heads.

In the past, it has been proposed to fasten the nails together by adhesives, by hot melt thermoplastic materials, and by strips of adhesively bonded tape, and by welding the nails to lengths of wire.

Adhesively bonding the nails together will work only where the nails can lie side by side in contact with each other. Such a nailing strip would then be somewhat similar to a strip of wire staples for example. Thus, in the past where nailing strips were formed by simply bonding the nails together with adhesive, it was usually the practise to form modified heads on the nails having the shape of a simple "T". Nails of this type are not completely satisfactory for all industrial applications since they have a lesser holding power than nails with conventional heads.

In addition, however, the adhesive bonding was, relatively speaking, fragile. As a result, the bond was quite easily broken in handling In an effort to overcome these problems, it has been proposed to bond the nails together with a hot melt thermo-plastic material This material is more suitable for bonding nails which are spaced apart, and are thus not in contact with one another. It is thus possible to bond nails together, where the nails are held apart from one another due to the shape of the head.

Again, however, in this case certain other problems arose. A firm plastic material was easily shattered by the impact of the plunger. A more flexible plastic material sticks to the parts and would accumulate in the nailing machine and eventually lead to a malfunction.

Attempts to secure nails using adhesive tape have also resulted in similar problems.

It has been proposed to secure nails in a strip, by welding them to two parallel lengths of wire. Such a system would have many advantages. Nails could be secured regardless of their head configuration, since they could be secured to the wire at various spacings along the wire.

Such wire, even though quite thin, is strong enough to withstand almost all shocks in handling, and thus the wastage of nails was reduced to a minimum. In addition, the design of the plunger in the nailing machine was such that it would break away the wire, carrying short lengths of wire with each nail which would then be either ripped off or driven into the wooden work piece. In neither case was there any serious problem created in the operation of the nailing machine itself.

In this case, however, there have been practical difficulties in the design and operation of the apparatus for assembling the nails into a strip and welding them to the wires.

As mentioned, the configuration of the nail head may vary according to the design of the nailing machine and according to the end use for which the nails are intended. Nails with an irregular or cut out shape in the head, can be assembled closer together in a strip. However, they must be welded to the wire in a uniform orientation, to ensure correct spacing and feeding to the plunger Any machine for welding nails to wire must therefore arrange the nails and feed them to the welding station in precisely spaced relation It is necessary to have some form of collating and indexing mechanism for sorting the nails, and arranging them in a strip with their nail heads in the correct orientation.

In the past, this has been a problem. Such collators were frequently liable to jam, when using nail heads with irregular shapes. In addition, they were not always 100% effective, and consequently some nails would be assembled in the strip in the wrong orientation. This would then lead to jamming of the nailing gun itself.

BRIEF SUMMARY OF THE INVENTION

With a view to overcoming these various disadvantages, the invention consists of an apparatus for forming nails into a nailing strip for use in association with nails having non-circular nail heads, in which such nails are welded to wire strip holders, said apparatus comprising a nail feed mechanism for feeding nails with their nail heads arranged in a random orientation, a nail indexing wheel, receiving nails from said nail feed mechanism, and indexing them into predetermined nail spacings, and rotating the nails to bring their heads into a predetermined orientation, a nail handling slide mechanism for receiving nails from said indexing means, wire feed means for feeding wire to one side of said nails in said nail handling slide, electrical welding contact means for contacting said wire, and pressing the same against a nail, and passing a welding current therethrough, sufficient to weld said wire to said nail, movement means for moving said welding contact towards and away from said nails in said nail handling slide, and, means for moving said nails along said nail handling slide in timed relation to the operation of said welding contact means whereby to sequentially weld each said nail on said wire.

More particularly, the invention provides apparatus having the foregoing advantages and wherein the indexing means comprises friction formations for engaging the head of the nails, and rotating the same as said indexing means moves them from said nail feed mechanism to said nail handling slide, and holder means for holding said nails when their heads have been rotated into a predetermined orientation.

More particularly, the invention provides apparatus having the foregoing advantages wherein there are two wires, located at spaced points along the shank of the nail, and including two welding contact members, for respective said wires, and movement means for moving the same.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a schematic top plan view of the nail feed indexing and welding mechanism;

FIGS. 2A and 2B are greatly enlarged partial top plan views corresponding to FIG. 1 showing portions of the nail indexing mechanism at different stages around its circumference;

FIG. 3 is a greatly enlarged top plan view of the welding mechanism, partially cut away and shown in section;

FIG. 4 is a section along the line 4—4 of FIG. 3;

FIG. 5 is a section along the line 5—5 of FIG. 3; and,

FIG. 6 is a fragmentary vertical section through the indexing mechanism of FIG. 1.

DESCRIPTION OF A SPECIFIC EMBODIMENT

The nail collating and welding machine embodying the inventive principles is shown generally in FIG. 1. It will be seen to comprise a nail supply chute 10, a nail indexing wheel 12, a nail collating guide 14, and a welding unit 16.

The nail supply 10 may be of any conventional design. Typically, nails are stored loose in a random manner in some form of storage container or hopper (not shown). Usually, some form of vibrator feed mechanism (not shown) is also provided, which delivers the nails by means of an angled slide 11.

The nails in the slide 10 are shown as the general reference N, and having heads H.

As will be seen in more detail in FIG. 2, the nail heads H are formed with a cut-out portion C, so that the nail heads have the general appearance of a crescent Nail heads having this configuration have the advantage that when the nails are placed with their shanks S closely adjacent to one another, with their heads overlapping, the shank of one nail may register with oval lie in the cut-out C of the next adjacent nail.

Nails of this type may thus be collated or arranged side by side with one another with a minimum of space between the nails In this way, a typical magazine of a typical nailing gun (not shown) may contain a greater number of nails, and thus may be operated for a greater length of time without requiring refilling.

The apparatus according to the invention will now be described in more detail in relation to the various subassemblies Thus as best shown in FIGS. 1, 2A and 2B, the indexing wheel 12 comprises a wheel body 20, and has a plurality of spaced grooves 22 formed in the outer surface.

The wheel body 20 has a top surface 24, and is mounted for rotation on a central axis 26. It is driven in an anti-clockwise manner by any suitable drive mechanism (not shown).

A top cover plate 28 is fastened to the central axis 26, and covers the central portion of the top of the wheel body 20.

Around approximately three-quarters of the perimeter of the wheel body, there is provided a cuff member 30. Cuff member 30 extends approximately from the nail delivery chute 10, to the entrance to the collating mechanism 14. It serves to engage the shanks of the nails, lying in the grooves 22 on the wheel body 20, and to hold them in position while the wheel body 20 rotates in an anti-clockwise clockwise fashion from the nail chute 10 to the collating mechanism 14.

Straps 32 may be used to hold the nail cuff 30 in position

The perimeter of the upper surface 24 of the wheel body 20 has a plurality of generally radial shallow frictional ribs or knurlings indicated as 34. These ribs or knurlings 34 extend around the full extent of the perimeter of the wheel body 20

The frictional knurlings or ribs 34 may be formed on a separate fixed plate in some cases. They are located on an angled or bevelled surface 35.

The purpose of the ribs 34 is to engage the underside of the nail heads H, and to cause the nail heads H to rotate, as the wheel body 20 rotates anti-clockwise.

As best shown in FIG. 2A, the nails may arrive at the wheel body 20, with their nail heads H and the crescent portions C in a random orientation.

However, as they traverse around, as shown in FIG. 2B, the nail heads will all be rotated, until the crescent portions C register with the perimeter of the wheel body 20.

In this position, the nail heads H will then be free to drop a short distance further down relative to the wheel body 20, and will be held in this orientation by the outside of wheel body 20 for the remainder of its rotation.

In this way, the wheel body 20 during its approximately three-quarters of a complete circle rotation, sorts out all of the nails arriving from the nail feed 10, and arranges them in predetermined precisely spaced apart intervals, and arranges them with their heads C in a predetermined orientation.

When the nails arrive at the entrance to the nail collating mechanism 14, they are removed from their respective grooves 22 by a transfer arm (not shown), and fed sequentially into the nail collating mechanism 14.

The nail collating mechanism 14 consists of two parallel spaced-apart feed bars or guide bars 36, which are arranged in parallel spaced-apart relationship, and define between them a guide slot 38. The guide slot 38 is spaced apart a sufficient distance to permit the nail shanks to slide there along, but is too narrow to permit the heads H to fall through.

A pusher arm 40 (FIG. 4 and FIG. 5) is mounted for reciprocal movement beneath bars 36.

Pusher arm 40 is connected to any suitable movement mechanism (not shown) such as a power cylinder (not shown) or the like, the operation of which will cause the arm 40 to move to and fro.

The travel of the pusher arm 40 is no more than a few inches. The pusher arm 40 will move away from the guide bars 36 to permit a new nail from the wheel 20 to register with the entrance to the slot 38.

The pusher arm 40 will then move in the reverse direction, so as to engage the nail, and force it along the slot 38, while maintaining the nail at a predetermined angle (FIG. 4).

This angle is such that the nail heads H of the nails will partially overlap as shown in FIG. 4, with the nail shank of one nail nesting in the crescent shaped cutout C in the head H of the next adjacent nail.

The next operation is the welding of the nails to the strands of wire.

The wire strands are shown as 42 and 44, and consist of upper and lower strands, being fed from respective upper and lower coils (not shown) stored in any suitable manner adjacent to the apparatus.

Suitable wire tensioning means will of course be incorporated, so as to maintain the wires 42 and 44 tight.

The upper and lower wires are fed around an arc, through respective guide tubes 46 and 48, which are mounted on respective upper and lower locations.

Two welding contact heads 50 and 52 are mounted one above the other in registration with wire strands 42 and 44.

The welding heads 50 and 52 are offset from one another whereby to register with the diagonal axis of each individual nail as it passes along guide slot 38.

Both welding heads 50 and 52 may be mounted on air cylinders 54 and 56 or other power operated means which are connected to a power source (not shown).

In this way the welding contact heads 50 and 52 may be moved towards and away from the nails in the nail guide slot 38.

The welding contact heads 50 and 52 are connected to any suitable source of welding current, which is connected through a suitable welding switch means, so that precisely regulated welding pulses may be applied to the heads 50 and 52 at timed intervals.

Such welding current supply is well known to persons skilled in the art and requires no further description.

When the welding contact heads 50 and 52 move towards the nails, the wires 42 and 44 will be pressed into contact on an individual nail, and simultaneously a welding current pulse will be passed through the heads 50 and 52 into the wires 42 and 44 thereby welding the wires to the nails.

It will of course be appreciated that the nails will be held on the opposite side, that is to say the side opposite to the welding heads 50 and 52, so as to resist the pressure of the welding contact heads 50 and 52, although such pressure resisting means are omitted for the sake of clarity.

In this way, each individual nail is sequentially welded to the two wires 42 and 44.

After welding to the wires the nails pass progressively along the guide slot 38 to a suitable cutting or shearing device (not shown) of a type well known in the art. This will cut the wire between two adjacent nails, after a predetermined number of nails has passed by, thereby severing the strip of nails into suitable length nailing strips, for use in typical nailing guns.

In operation, nails are fed continuously down the nail feed chute 10, and arrive with their heads arranged in a more or less random manner (FIG. 2A) at the indexing wheel 20.

As each empty groove 22 registers with the end of the nail slide, a nail will drop into the groove, and then will be carried around by the wheel.

The nail is retained in position on the wheel by the cuff 30.

As the nails progress around their circular path, the nail heads are rotated by contact with the ridges 34.

When the crescent shaped cutout portion C of the nail comes into registration with the edge of the wheel, the nail can then drop downwardly below the level of the ridges 34.

The nail will thus be held against rotation, and will have been indexed into a precise orientation.

When the nails arrive at the nail collating guide 36, as each nail registers with the entrance to the slot 38, it is contacted by the pressure member 40, and is forced along the slot 38.

This will cause all of the nails in the slot 38 to progress along the slot.

The arrangement of the pressure member 40 is such that the nails will be collated in a generally diagonal alignment as shown in FIG. 4, with the nail heads overlapping one another, and with the shank of one nail registering and lying in the cutout portion C of the next adjacent nail and so on.

As the nails are driven progressively past the welding heads 50 and 52, they are each individually welded to the two wires 42 and 44. This is achieved by the movement of the two welding heads which move towards and away from the nails. In their inward movement, they press the two wires 42 and 44 firmly against the nail to be welded, and a welding current is passed through the heads 50 and 52, thereby procuring the necessary welds.

As mentioned above, any suitable form of cut-off device (not shown) such as is well known in the art will be provided downstream of the welding heads whereby the strip of nails may be cut at intervals, to provide nailing strips suitable for use in nailing hammers of the type described.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. Apparatus for forming nails into a nailing strip for use with nails having nail heads, each having a registering formation for registering with the shank of an adjacent nail, in which such nails are welded to at least one wire, said nails extending diagonally to said strip with the registering formation of each said nail head registering with the shank of an adjacent nail, said apparatus comprising:
   a nail feed mechanism for feeding said nails with their nail heads arranged in a random orientation;
   a nail indexing and transfer wheel receiving said nails from said nail feed mechanism and indexing them into predetermined nail spacings;
   a nail handling slide mechanism for receiving said nails from said indexing and transfer wheel;
   rotation means associated with said nail indexing and transfer wheel and comprising friction means for engaging said nails to rotate said nails as said indexing and transfer wheel moves them from said nail feed mechanism to said nail handling slide to bring said heads into a predetermined orientation and holder means for holding said nails in said predetermined orientation once their heads have been rotated into said predetermined orientation;

pusher means operable to push said nails from said nail indexing and transfer wheel and into and along said slide mechanism in strip disposition therein with the shank of each said nail registering with the registering formation of the head of an adjacent nail, and with said shanks of said nails lying on parallel axes which extend diagonally to the axis of said strip;

at least one wire feed means for feeding said at least one wire to one side of said nails in said nail handling slide, said at least one wire extending along an axis parallel to the axis of said strip and diagonally to said shanks of said nails;

electrical welding contact means for contacting said at least one wire and pressing the same sequentially against each said nail and passing a welding current therethrough sufficient to weld said at least one wire to said nail; and movement means for moving said welding contact means towards and away from said nails in said nail handling slide, said pusher means being operable to move said nails along said nail handling slide in timed relation to the operation of said welding contact means whereby to sequentially weld said at least one wire to each said nail so to from said nailing strip.

2. Apparatus as claimed in claim 1 wherein there are two said wire feed means for feeding two said wires, located at spaced points along the shank of each nail, and wherein said contact means comprises two welding contact members for respective said wires.

3. Apparatus as claimed in claim 2 wherein said nail indexing and transfer wheel comprises a generally cyindrical body, a plurality of parallel spaced-apart nail-receiving grooves in said body, and in which said holder means comprises a guide rail means around said body, said nails being received in respective said parallel grooves, and being held therein by said guide rail means during rotation of said indexing and transfer wheel.

4. Apparatus as claimed in claim 3 wherein said rotation means comprises a top member located above said generally cylindrical body, and in which said friction means comprise a plurality of radial friction formations on an outwardly and downwardly sloping surface of said top member for engaging said nail heads and for progressively rotating said nails into said predetermined orientation thereof by frictional engagement therewith as said indexing and transfer wheel rotates relative to said top member.

5. Apparatus as claimed in claim 4 wherein said top member extends around an arc of approximately three quarters of a circle, commencing adjacent said nail feed mechanism, and terminating adjacent said nail handling slide mechanism.

* * * * *